United States Patent
Kang

(10) Patent No.: US 6,942,074 B2
(45) Date of Patent: Sep. 13, 2005

(54) DRUM BRAKE SYSTEM FOR VEHICLE

(75) Inventor: Byeong-Wook Kang, Suwon-si (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/899,677

(22) Filed: Jul. 27, 2004

(65) Prior Publication Data

US 2005/0023087 A1 Feb. 3, 2005

(30) Foreign Application Priority Data

Jul. 31, 2003 (KR) .................................. 10-2003-0053080

(51) Int. Cl.⁷ .............................................. F16D 51/00
(52) U.S. Cl. ....................................................... 188/325
(58) Field of Search ........................... 188/74, 78, 325, 188/326–328, 342, 106 P

(56) References Cited

U.S. PATENT DOCUMENTS

| | | | | | |
|---|---|---|---|---|---|
| 1,699,155 | A | * | 1/1929 | Muhleisen | 188/326 |
| 1,705,737 | A | * | 3/1929 | Sanford | 188/324 |
| 1,757,071 | A | * | 5/1930 | Bendix | 188/362 |
| 1,860,011 | A | * | 5/1932 | Brauks | 188/335 |
| 1,871,458 | A | * | 8/1932 | Lyman | 188/332 |
| 1,948,822 | A | * | 2/1934 | Lindblom | 188/323 |
| 1,998,659 | A | * | 4/1935 | Dodge | 192/78 |
| 3,612,228 | A | * | 10/1971 | Rick | 188/106 P |
| 3,708,044 | A | * | 1/1973 | Torri et al. | 188/326 |
| 5,529,149 | A | * | 6/1996 | Johannesen et al. | 188/70 R |
| 6,253,890 | B1 | * | 7/2001 | Hunter | 188/325 |
| 6,374,962 | B1 | * | 4/2002 | Doolittle | 188/106 F |

* cited by examiner

Primary Examiner—Chris Schwartz
(74) Attorney, Agent, or Firm—Morgan Lewis & Bockius LLP

(57) ABSTRACT

A drum brake system adapted to transmit force to left and right levers for evenly contacting the left and right shoes to the drum when the driver depresses the brake pedal. The force is transmitted from a wheel cylinder, thereby resulting in an effective braking action due to the even contact between the drum and the shoes, and an improvement of the durability of components by preventing a partial wear and tear of the shoes.

2 Claims, 3 Drawing Sheets

DRUM BRAKE SYSTEM FOR VEHICLE

CROSS-REFERENCE TO RELATED APPLICATIONS

This application claims priority of Korean Application No. 10-2003-0053080, filed on Jul. 31, 2003, the disclosure of which is incorporated fully herein by reference.

FIELD OF THE INVENTION

The present invention relates to a drum brake system. More particularly, the present invention relates to a drum brake system incorporated in a vehicle in which curved brake shoes are configured to evenly contact the inner circumference of a drum when the driver depresses the brake pedal.

BACKGROUND OF THE INVENTION

In a drum brake system, a shoe is fixed at one end to a back plate via a pivot and the other end of the shoe contacts the piston of a wheel cylinder. Therefore, if the piston of the wheel cylinder pushes the shoe, the shoe shifts in relation to the pivot and presses against the inner circumference of the drum for producing a braking force.

Accordingly, in the conventional drum brake system, when the shoe compresses the drum, a portion of the shoe fixed via the pivot has a harder time contacting the inner circumference of the drum than a portion of the shoe that contacts with the piston of the wheel cylinder.

SUMMARY OF THE INVENTION

Embodiments of the present invention provided equally distributed the operational force transmitted from the wheel cylinder to both ends of the shoe when the driver depresses the brake pedal, thereby enabling the shoe to uniformly contact the inner circumference of the drum, preventing a partial wear and tear of the shoe, and improving the braking efficiency.

A preferred embodiment of the present invention comprises levers configured to cross each other for evenly transmitting operational force, which is transmitted from a wheel cylinder, to both ends of left and right shoes.

In an alternative embodiment, a brake drum contains opposed shoes disposed therein. At least one return spring, and preferably two, biases the shoes centrally, away from the drum inner wall. A scissors mechanism acts between the shoes with opposite ends of the mechanism bearing on opposite ends of the shoes. A wheel cylinder is disposed between the levers at one end to expand the scissors mechanism via brake fluid pressure such that the expanding scissors force the shoes outward with substantially even pressure over their circumference.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

A preferred embodiment of the present invention will now be described in detail with reference to the attached drawings.

Figure 1:
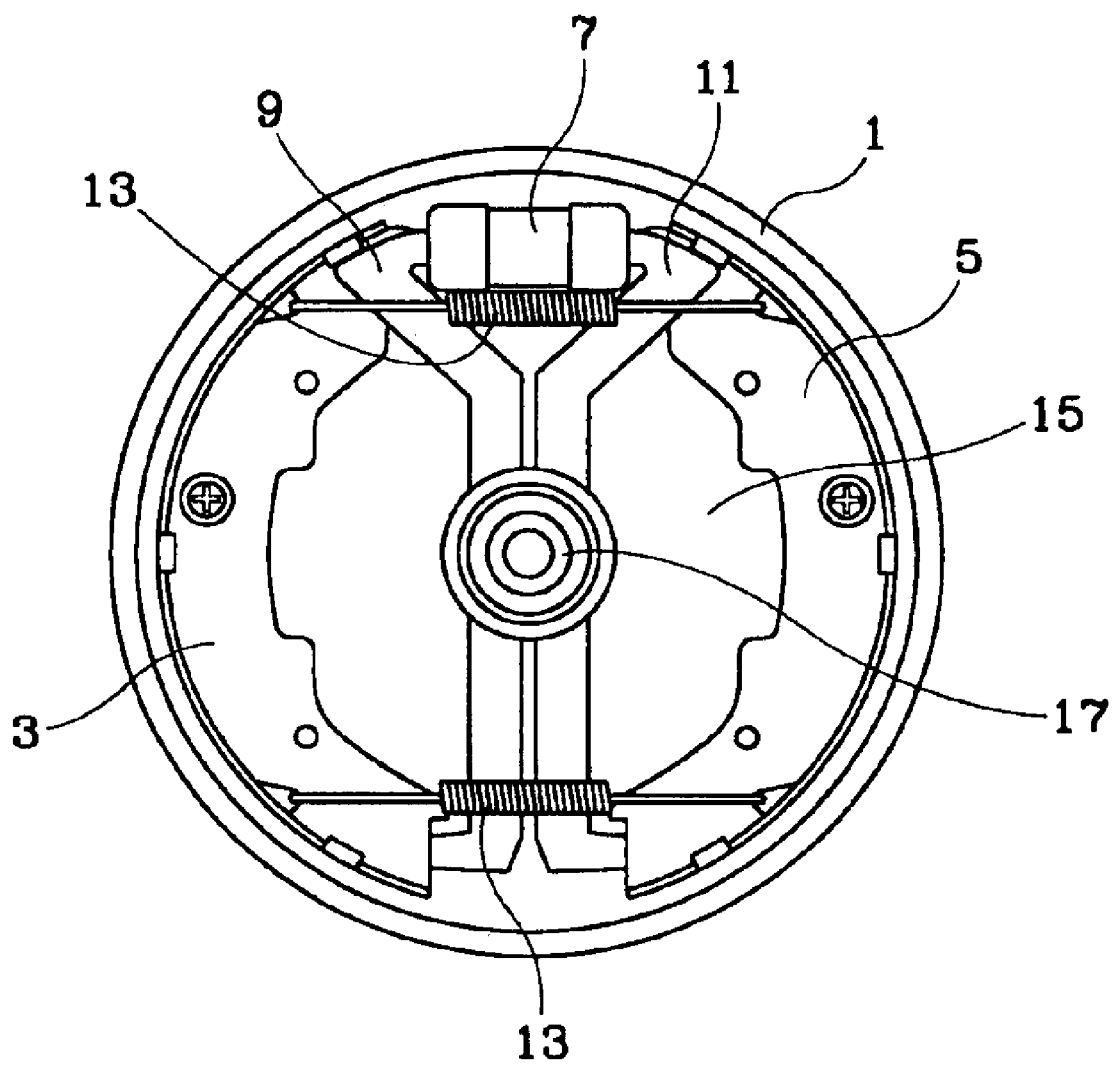
FIG. 1 is a schematic view of a drum brake according to an embodiment of the present invention.

With reference to FIG. 1, a left shoe 3 and a right shoe 5 are installed at both inner sides of a drum 1. A wheel cylinder 7 is equipped at an upper side of the drum 1. Levers 9 and 11 are installed between the wheel cylinder 7 and the shoes 3 and 5. The levers are configured to cross each other for evenly transmitting operational force to both ends of the left and right shoes 3 and 5, wherein the operational force is transmitted from the wheel cylinder 7.

The levers comprise a left lever 9 and a right lever 11 and form a "scissor" shape by centrally pivotally connecting each other. The left and right shoes 3 and 5 are tensioned by a return spring 13 and closely adhered to the left and right levers 9 and 11.

The outer side of one end of each left and right levers 9 and 11 is in contact with the one end of the left and right shoes 3 and 5, respectively. The outer side of the other end of each left and right levers 9 and 11 is in contact to the other end of the left and right shoes 3 and 5, respectively. The inner side of the other end of each left and right levers 9 and 11 is in contact with the wheel cylinder 7.

Figure 2:
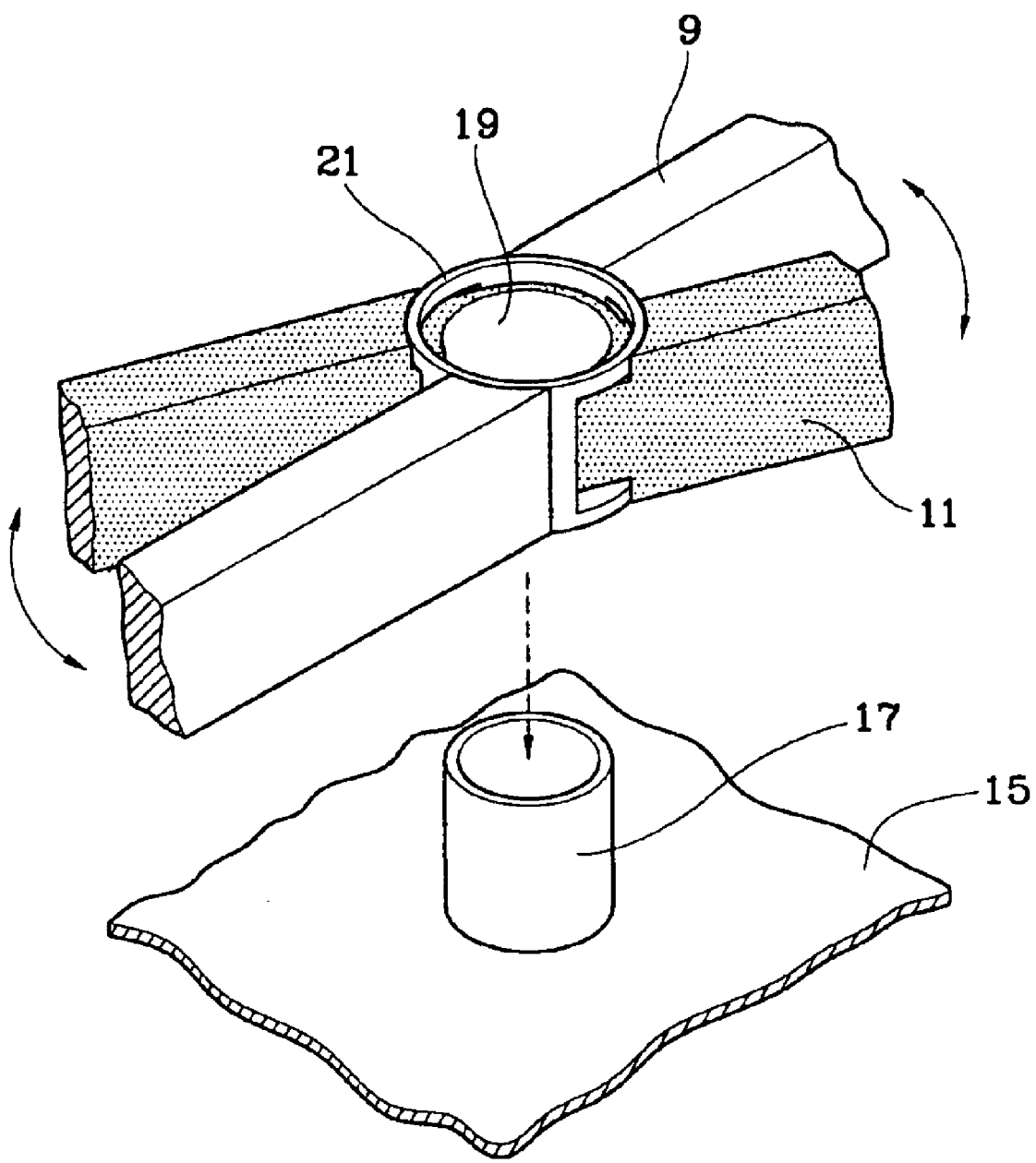
FIG. 2 is a detailed perspective view of a portion of FIG. 1.

With reference to FIG. 2, the central portions of the left and right levers 9 and 11 are pivotally connected to each other. A boss 17 is formed at the center of a back plate 15 for providing a pivot shaft of the left and right levers 9 and 11. A hinge hole 19 is formed at the center of the right lever 11 for being inserted into the boss 17. A guiding groove is formed around the hinge hole 19. A guiding ring 21 is formed at the center of the left lever 9 for being inserted into the guiding groove.

That is, the right lever 11 is pivotally formed in relation to the boss 17 and the left lever 9 is pivotally formed in relation to the right lever 11. As a result, the left and right levers 9 and 11 are pivotally connected to each other in relation to the boss 17.

Figure 3:
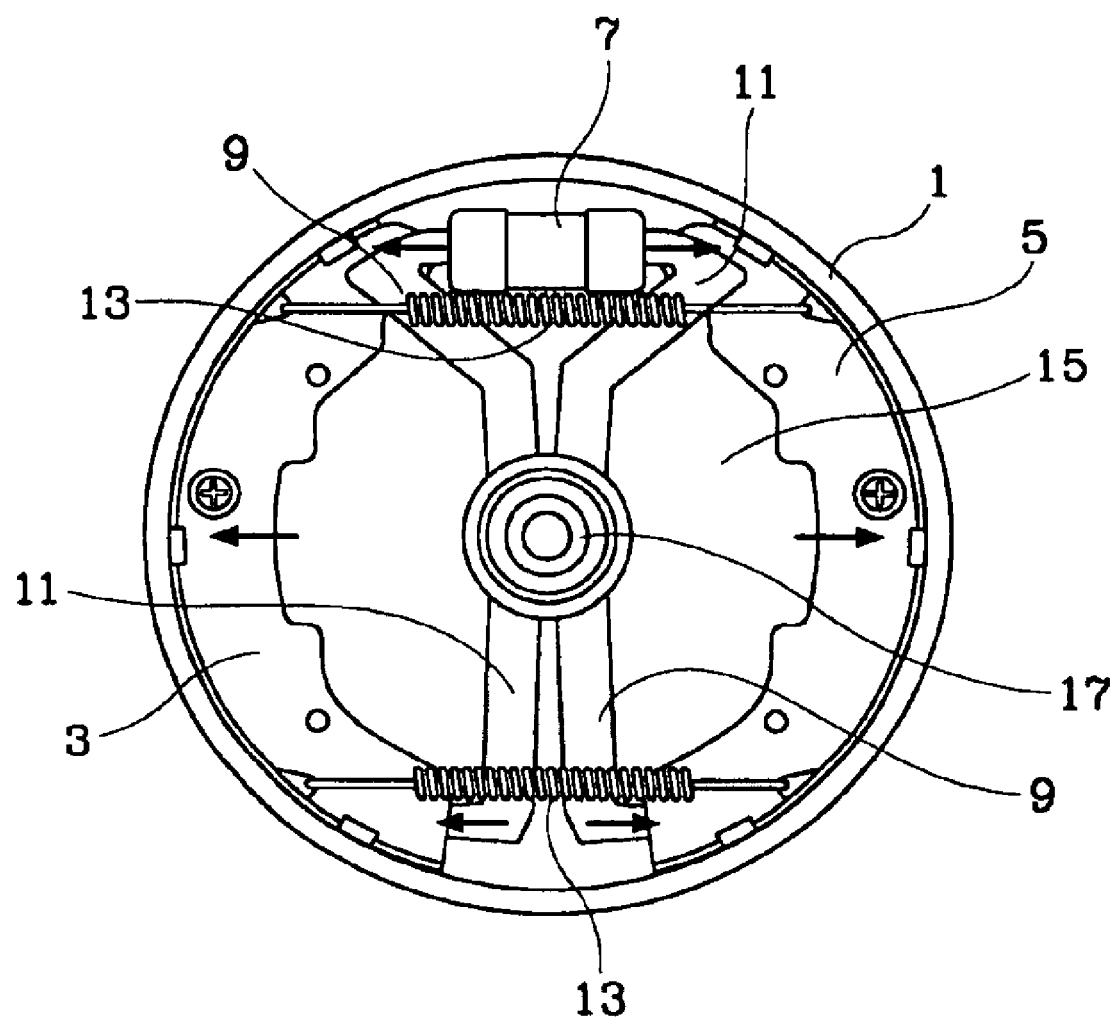
FIG. 3 illustrates an operational state of the drum brake of FIG. 1.

When the driver depresses a brake pedal, the braking hydraulic pressure is transmitted to the wheel cylinder 7, and thus, the pistons of the wheel cylinder 7 push out the inner side of one end of each left and right levers 9 and 11. Therefore, as illustrated in FIG. 3, the outer side of one end of each left and right levers 9 and 11 forcibly presses one end of each left and right shoes 3 and 5 toward the inner circumference of the drum 1, respectively. Simultaneously, the other end of the left lever 9 forcibly presses the other end of the right shoe 5 towards the inner circumference of the drum 1, and the other end of the right lever 11 forcibly presses the other end of the left shoe 3 toward the inner circumference of the drum 1.

Accordingly, both ends of the left and right shoes 3 and 5 are compressed by an even pressure toward the inner circumference of the drum 1 at the same time, so that the outer sides of the shoes 3 and 5 contact the inner circumference of the drum 1 under an even pressure distribution. The outer sides of the shoes 3 and 5 and the inner circumference of the drum 1 can produce a large friction by an even contact, improving the braking efficiency and increasing the durability by an even wear and tear of the shoes 3 and 5.

As apparent from the foregoing, there is an advantage in the present invention in that when the driver depresses the brake pedal, a force transmitted from the wheel cylinder is delivered to the left and right levers for evenly contacting the left and right shoes to the drum, thereby contributing to an effective braking action due to the even contact between the drum and the shoes, and an improvement of the durability of components by preventing a partial wear and tear of the shoe.

What is claimed is:

1. A drum brake system, comprising levers configured to cross each other for evenly transmitting an operational force to both ends of left and right shoes, wherein the operational force is transmitted from a wheel cylinder, and wherein:

said levers are composed of a left lever and a right lever and form a "scissor" shape by centrally pivotally connecting each other;

the inner side of one end of each said left and right levers contacts with said wheel cylinder;

the outer side of one end of each said left and right levers contacts one end of said left and right shoes, respectively; and the outer side of the other end of each said left and right levers contacts with the other end of said left and right shoes, respectively.

2. The system as defined in claim 1, wherein the system further comprises:

a boss formed at a center of a back plate for providing a pivot shaft of said left and right levers;

a hinge hole formed at the center of said right lever for being inserted onto said boss;

a guiding groove formed around said hinge hole; and a guiding ring formed at the center of said left lever for being inserted into said guiding groove.

* * * * *